US010166928B2

(12) United States Patent
Loew (10) Patent No.: US 10,166,928 B2
(45) Date of Patent: Jan. 1, 2019

(54) STORAGE COMPARTMENT DIVIDER HAVING PARTITION WITH HINGED TELESCOPING SECTIONS (71) Applicant: FORD GLOBAL TECHNOLOGIES, LLC, Dearborn, MI (US)

(72) Inventor: Pattrick Loew, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 15/208,920

(22) Filed: Jul. 13, 2016

(65) Prior Publication Data
US 2018/0015883 A1    Jan. 18, 2018

(51) Int. Cl.
*B60R 7/02*     (2006.01)
*B65D 25/06*    (2006.01)
*B60R 5/04*     (2006.01)
*B60R 13/01*    (2006.01)

(52) U.S. Cl.
CPC ............ *B60R 7/02* (2013.01); *B65D 25/06* (2013.01); *B60R 5/04* (2013.01); *B60R 13/011* (2013.01)

(58) Field of Classification Search
CPC ................................ B60R 7/02; B65D 25/06
USPC .................... 296/37.16, 37.5, 39.1
See application file for complete search history.

(56) References Cited

U.S. PATENT DOCUMENTS

| 4,718,584 | A | * | 1/1988 | Schoeny | B60R 7/02 217/12 R |
| 4,770,579 | A | | 9/1988 | Aksamit | |
| 4,941,784 | A | | 7/1990 | Flament | |
| 5,161,700 | A | * | 11/1992 | Stannis | B60R 7/02 211/175 |
| 5,526,972 | A | * | 6/1996 | Frazier | B60R 7/02 220/529 |
| 5,961,171 | A | * | 10/1999 | Iijima | B60R 7/02 220/531 |
| 6,503,036 | B1 | | 1/2003 | Bequette et al. | |
| 6,644,712 | B1 | * | 11/2003 | Rafi-Zadeh | B60R 9/00 296/37.16 |
| 6,682,118 | B2 | | 1/2004 | Ryan | |
| 7,959,390 | B2 | * | 6/2011 | Gorski | B60R 7/02 410/121 |
| 2003/0111503 | A1 | * | 6/2003 | Miller | B60R 7/02 224/539 |

(Continued)

FOREIGN PATENT DOCUMENTS

| DE | 2344938 A1 | 4/1975 |
| JP | 2001063450 A | 3/2001 |

(Continued)

OTHER PUBLICATIONS

English Machine Translation of DE2344938A1.

(Continued)

*Primary Examiner* — Jason S Morrow
*Assistant Examiner* — E Turner Hicks
(74) *Attorney, Agent, or Firm* — Vichit Chea; King & Schickli, PLLC (57) ABSTRACT

A storage compartment divider includes a partition having a first section with a first peg and a second section with a second peg. A hinge connects the first and second sections together. In addition the storage compartment divider includes a base having a plurality of sockets that receive the two pegs and hold the partition in a plurality of positions.

18 Claims, 9 Drawing Sheets

(56) References Cited

U.S. PATENT DOCUMENTS

2009/0169322 A1*  7/2009  Aro ...................... B60P 7/0892
                                                    410/102

FOREIGN PATENT DOCUMENTS

| JP | 2008012998 A | 1/2008 |
|----|--------------|--------|
| JP | 2010076871 A | 4/2010 |

OTHER PUBLICATIONS

English Machine Translation of JP2001063450A.
English Machine Translation of JP2008012998A.
English Machine Translation of JP2010076571A.
John Deere International, Cargo Box Divider, Apr. 5, 2016, pp. 1 of 1, https://www.deere.com/en_INT/products/attachment/gator_utility_attachments/cargo_box_options_storage/cargo_box_divider/cargo_box/divider.page.

* cited by examiner

STORAGE COMPARTMENT DIVIDER HAVING PARTITION WITH HINGED TELESCOPING SECTIONS

TECHNICAL FIELD

This document relates generally to the motor vehicle equipment field and, more particularly, to a storage compartment divider having a partition including hinged telescoping sections.

BACKGROUND

Many motor vehicles are equipped with relatively large storage areas or cargo floors adapted to accommodate larger and more bulky cargo items. Unfortunately, smaller cargo items have a tendency to shift, move and roll across a large storage area or cargo floor during motor vehicle operation such as while cornering or stopping the motor vehicle. The shifting of cargo items can be a distraction and annoyance for motor vehicle occupants. Further, fragile items such as bread, light bulbs, eggs and the like may be damaged when a heavier item shifts into contact, impacting the fragile item.

In order to address these problems, various partitions and dividers have been developed for the cargo floor or cargo area of motor vehicles. Unfortunately, those dividers developed to date generally have limited versatility because they are not sufficiently configurable and customizable to meet the various needs and applications of the vehicle operator.

This document relates to a new and improved storage compartment divider with greatly enhanced configurability, allowing the divider to be customized to meet the needs of the motor vehicle operator for substantially any foreseeable application.

SUMMARY

In accordance with the purposes and benefits described herein, a storage compartment divider is provided. That storage compartment divider includes a partition including a first section with a first peg and a second section with a second peg. The first and second sections are connected together by means of a hinge. Further, the storage compartment divider includes a base having a plurality of sockets. Those sockets are adapted to receive the first peg and the second peg and hold the partition in a plurality of different use positions.

The first section may include a first divider panel and a first telescoping extension panel. More specifically, the first divider panel may include a first pocket and the first extension panel may slide in that first pocket. The second section may include a second divider panel and a second telescoping panel. More specifically, the second divider panel may include a second pocket and the second extension panel may slide in the second pocket.

The hinge may connect the first divider panel to the second divider panel. Further, the first peg may be carried on the first telescoping extension panel. The second peg may be carried on the second telescoping extension panel.

The first telescoping extension panel may also include a first margin defining a first hand opening adjacent the first peg. Similarly, the second telescoping extension panel may include a second margin defining a second hand opening adjacent the second peg.

The base may include a receiver sized and shaped to receive and hold the partition at the hinge when the first section and the second section are folded together about the hinge. The base may comprise a rail secured to a storage compartment floor of the motor vehicle. That rail may define a polygonal shape. In other embodiments, the base may comprise a support and a rail secured to the support. That rail may define a polygonal shape and the support may be bordered by the rail.

In the following description, there are shown and described several preferred embodiments of the storage compartment divider. As it should be realized, the storage compartment divider is capable of other, different embodiments and its several details are capable of modification in various, obvious aspects all without departing from the storage compartment divider as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the storage compartment divider and together with the description serve to explain certain principles thereof. In the drawing figures.

Reference will now be made in detail to the present preferred embodiments of the storage compartment divider, examples of which are illustrated in the accompanying drawing figures.

DETAILED DESCRIPTION

Reference is now made to FIGS. 1-7, illustrating the storage compartment divider 10. The storage compartment divider 10 includes a partition, generally designated by reference numeral 12 and a base, generally designated by reference numeral 14.

Figure 1:
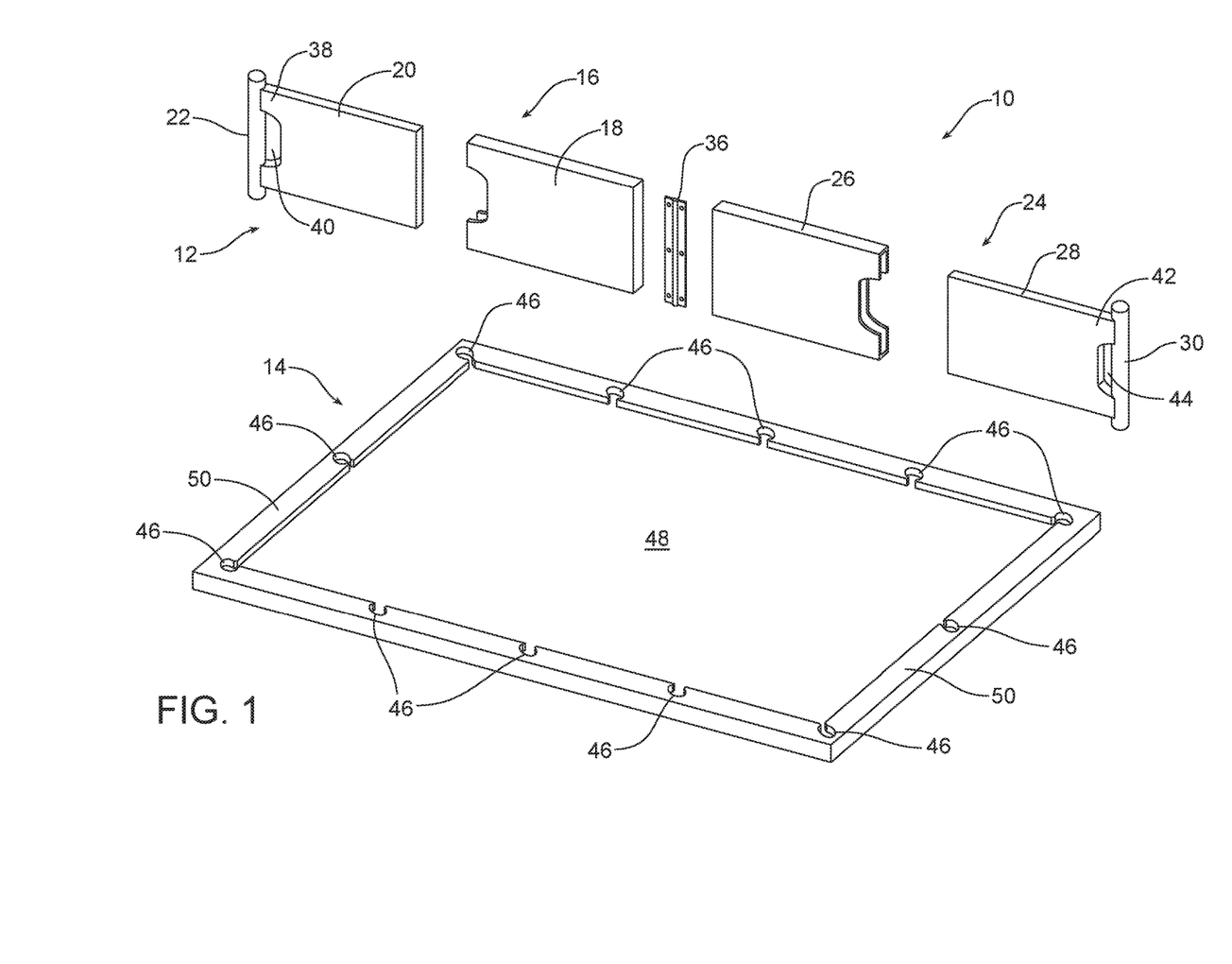
FIG. 1 is an exploded perspective view of the storage compartment divider including the base and the first and second sections of the partition.

The partition 12 includes a first section 16 which comprises a first divider panel 18 and a first telescoping extension panel 20. A first peg 22 is carried on the first telescoping extension panel 20.

The partition 12 also includes a second section 24 comprising a second divider panel 26 and a second telescoping extension panel 28. A second peg 30 is carried on the second telescoping extension panel.

Figure 2:
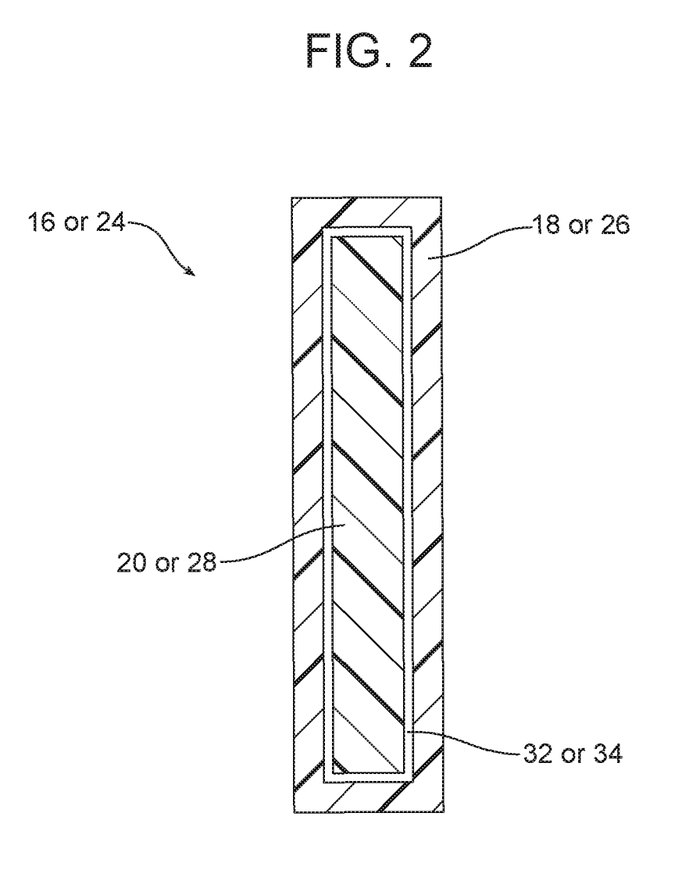
FIG. 2 is a cross-sectional view through the first section or second section of the partition.

As best illustrated in FIG. 2, the first divider panel 18 includes a first pocket 32. The first telescoping extension panel 20 is received and slides in the first pocket 32 thereby allowing one to adjust the overall length of the first section 16 of the partition 12. As also illustrated in FIG. 2, the second divider panel 26 includes a second pocket 34. The second telescoping extension panel 28 is received and slides in the second pocket 34 allowing one to adjust the length of the second section 24 of the partition 12.

With reference back to FIG. 1, a hinge 36 connects the first divider panel 18 to the second divider panel 26. A first margin 38 of the first telescoping extension panel 20 defines a first hand opening 40 adjacent the first peg 22. Similarly, a second margin 42 of the second telescoping extension panel 28 defines a second hand opening 44 adjacent the second peg 30.

The base 14 includes a plurality of sockets 46. As will be apparent from the following description, those sockets 46 receive the first peg 22 and the second peg 30 and hold the partition 12 in a plurality of positions or configurations thereby allowing the user to customize the storage compartment divider 10 to meet his needs for any particular application.

In the illustrated embodiment, the base 14 includes a support 48 and a rail 50 secured to the support. More specifically, the support 48 is bordered by the rail 50 which defines a polygonal shape. The base 14 may be sized and shaped to be received on a cargo floor of a motor vehicle such as within a trunk or behind the rear seat of a sport utility vehicle or crossover vehicle. In other embodiments, the base 14 may simply comprise a rail 50 which may be integrally formed with the motor vehicle trim outlining the trunk or storage space. Alternatively, the rail 50 may be connected directly to the trim or the motor vehicle floor by means of appropriate fasteners.

Figure 3A:
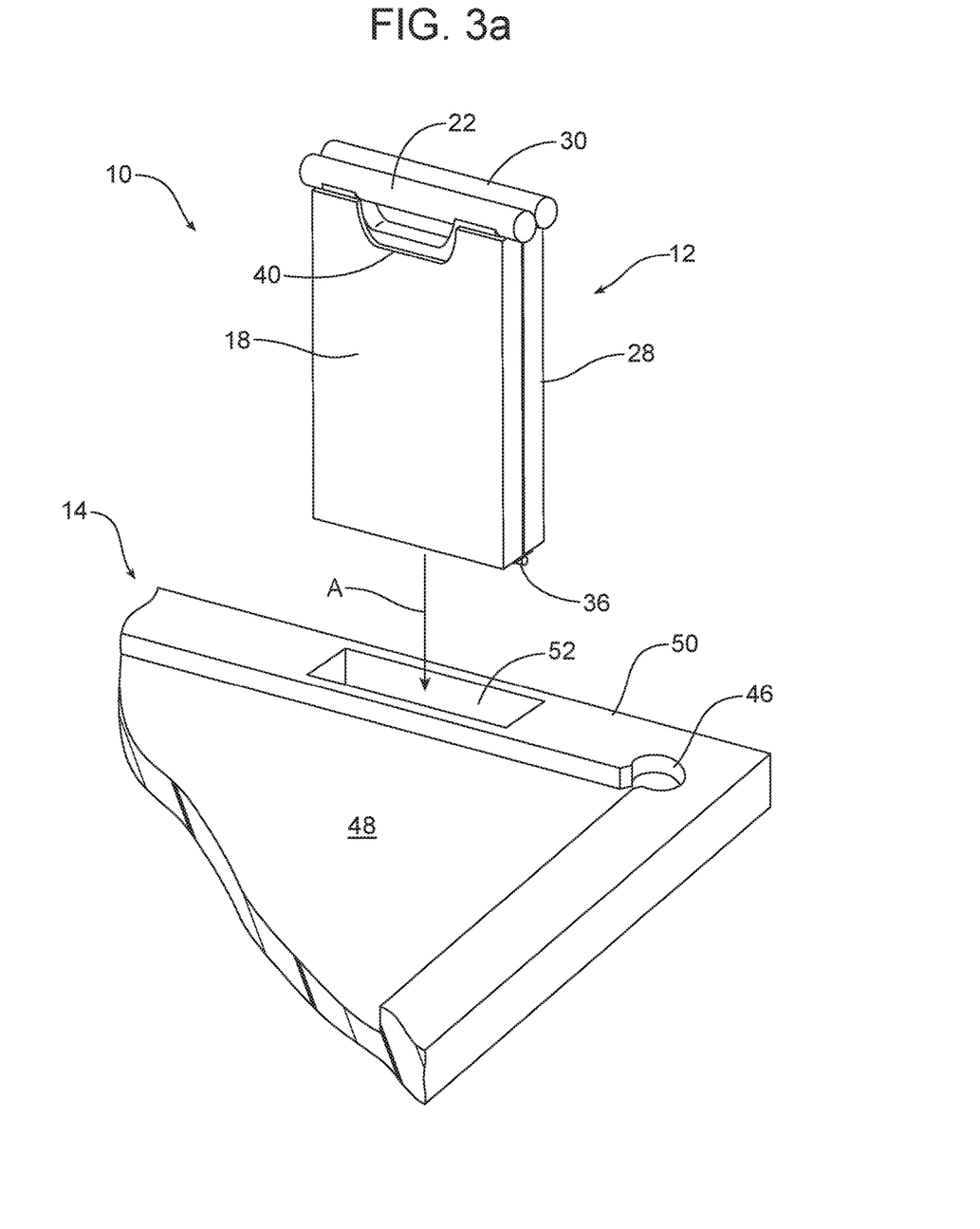
FIG. 3a shows the partition folded together and being placed in a receiver provided in base.
Figure 3B:
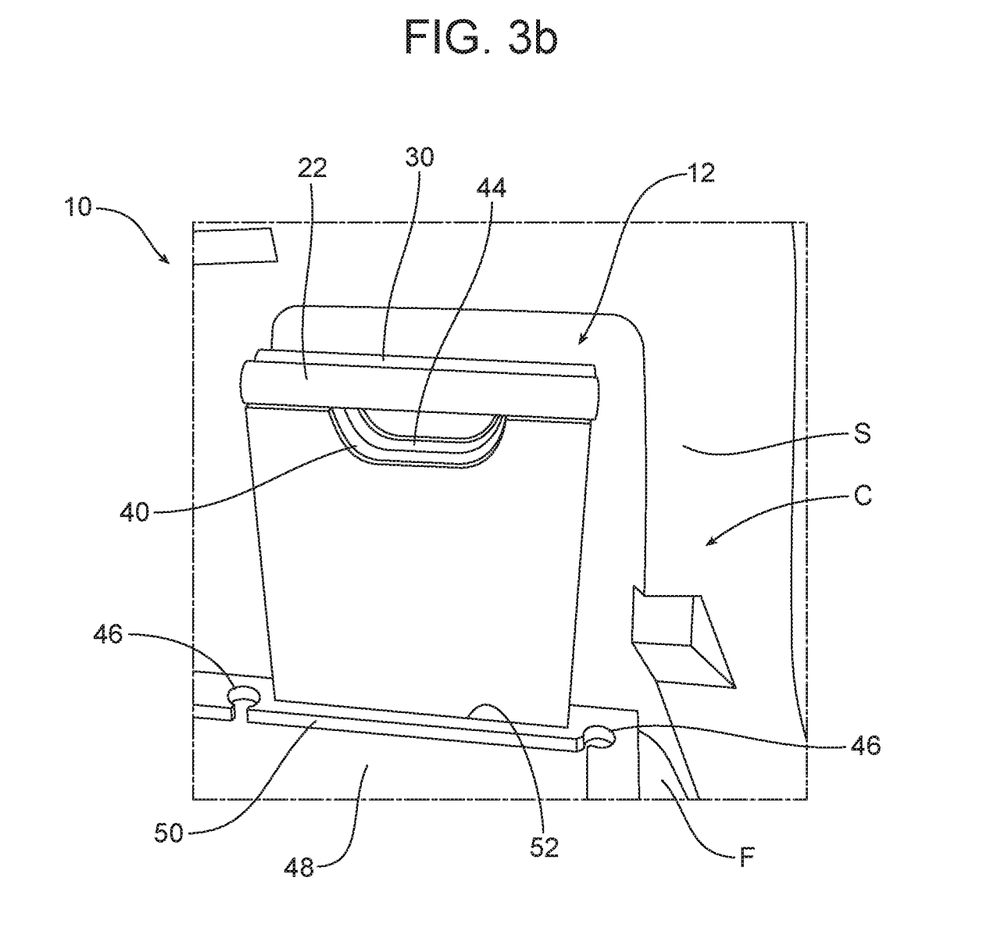
FIG. 3b shows the partition held in the base where it may be stowed until needed.

As best illustrated in FIGS. 3a and 3b, the partition 12 may be easily stowed in a convenient-to-reach location when not in use. More specifically, the rail 50 of the base 14 may include a receiver 52 shaped to receive and hold the partition 12 at the hinge end thereof when the first section 16 and second section 24 are folded together about the hinge 36. In the illustrated embodiment, the receiver 52 comprises a slot. FIG. 3a shows the partition 12 as it is being aligned for insertion (note action arrow A) in the receiver 52. FIG. 3b shows the partition 12 received and held in the receiver 52 where it is stowed, for example, adjacent a sidewall S of the storage compartment on the floor F of the motor vehicle. In this stowed position the first peg 22 and the second peg 30 are oriented up the first hand opening 40 and second hand opening 44 are presented so that the partition may be easily and quickly grasped by a user and removed from the receiver.

Figure 4A:
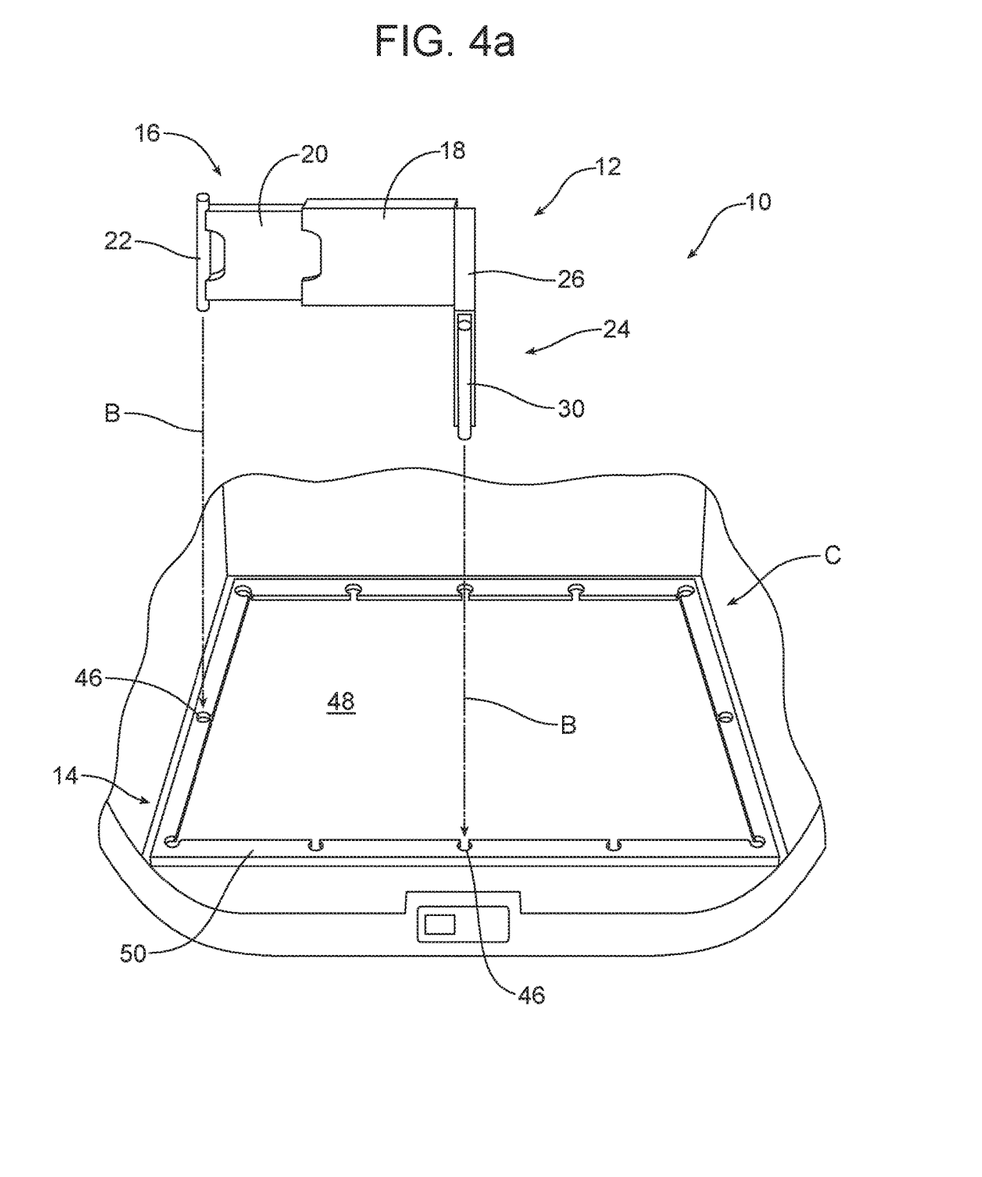
FIG. 4a is a perspective view showing the partition folded into a desired configuration and being inserted in two of the sockets provided in the base.
Figure 4B:
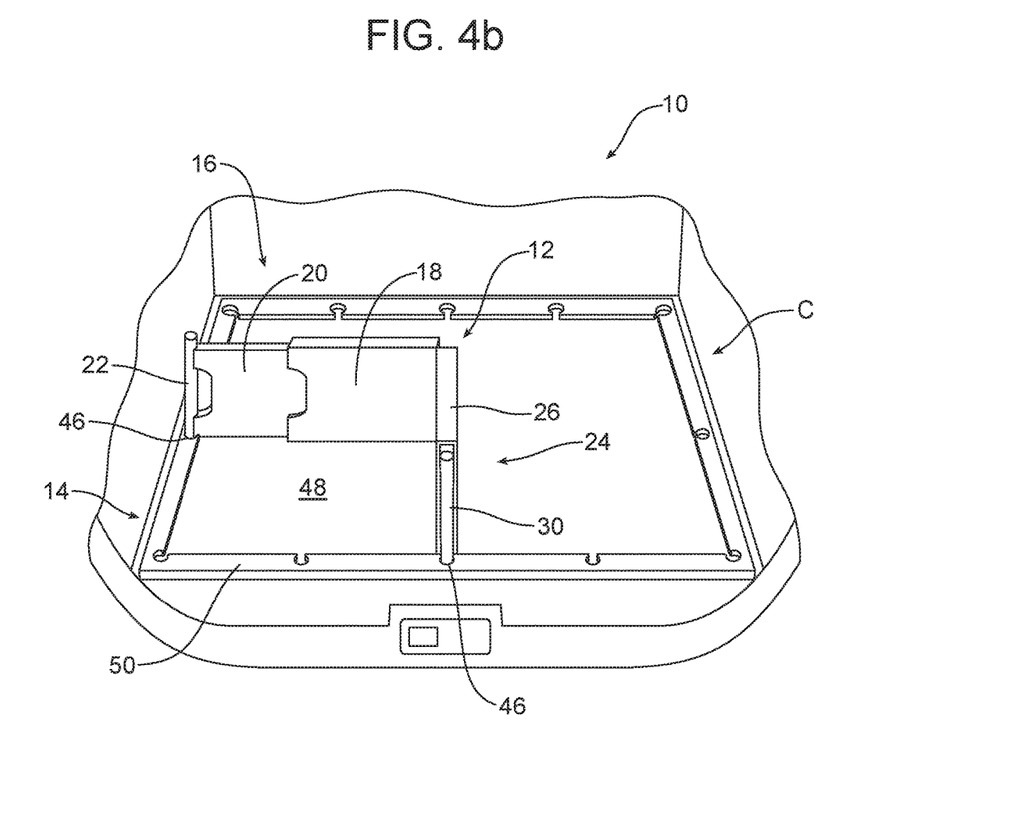
FIG. 4b shows the partition of FIG. 4a now mounted in place on the base.

Reference is now made to FIGS. 4a and 4b illustrating how the partition 12 may be configured into a first configuration or position and secured to the base 14 where it is held in an upright position dividing the storage area or compartment C as desired by the user. More specifically, in order to configure the partition 12 one adjusts the angle of the first divider panel 18 with respect to the second divider panel 26 by means of the hinge 36. In addition, one adjusts the relative length of the first section 16 of the partition 12 by extending or retracting the first telescoping extension panel 20 with respect to the first divider panel 18. Similarly, one also adjusts the relative length of the second section 24 of the partition 12 by extending or retracting the second telescoping extension panel 28 with respect to the second divider panel 26. When properly adjusted, the first peg 22 is aligned with a first selected socket 46 in the rail 50 of base 14 while the second peg 30 is aligned with a second selected socket in the rail of the base and the partition 12 is moved in the direction of action arrows B toward the base 14 until the first peg 22 and the second peg 30 are received in the desired sockets 46 (See FIG. 4b). The first peg 22 and the second peg 30 are snugly held in the sockets 46 so that the partition 12 is held in an upright position defining a storage space of desired size and shape for holding a particular cargo item to be transported.

Figure 5:
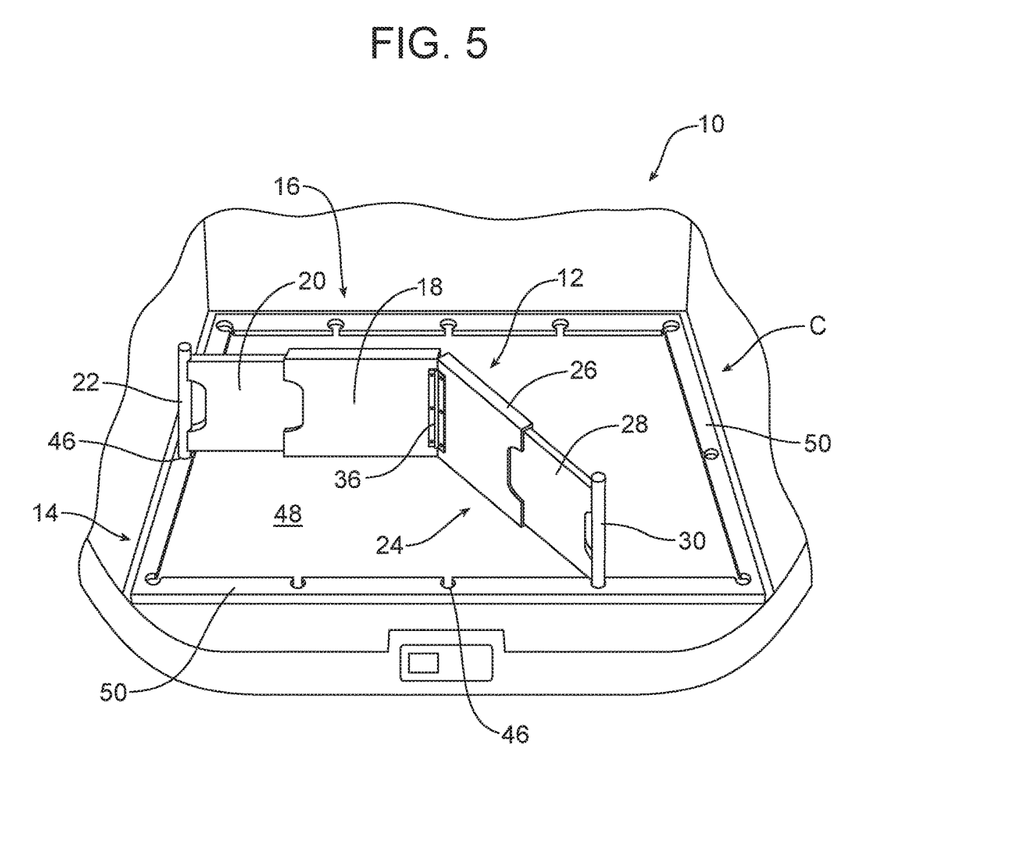
FIGS. 5-7 show additional possible configurations for the partition to help demonstrate the configurability and versatility of the storage compartment divider.
Figure 6:
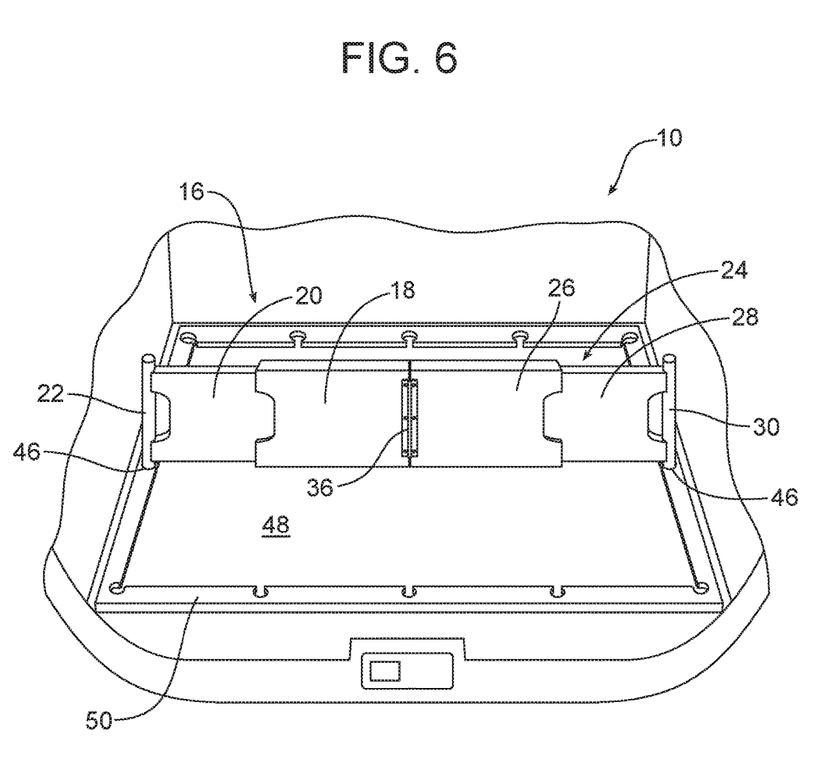
Figure 7:
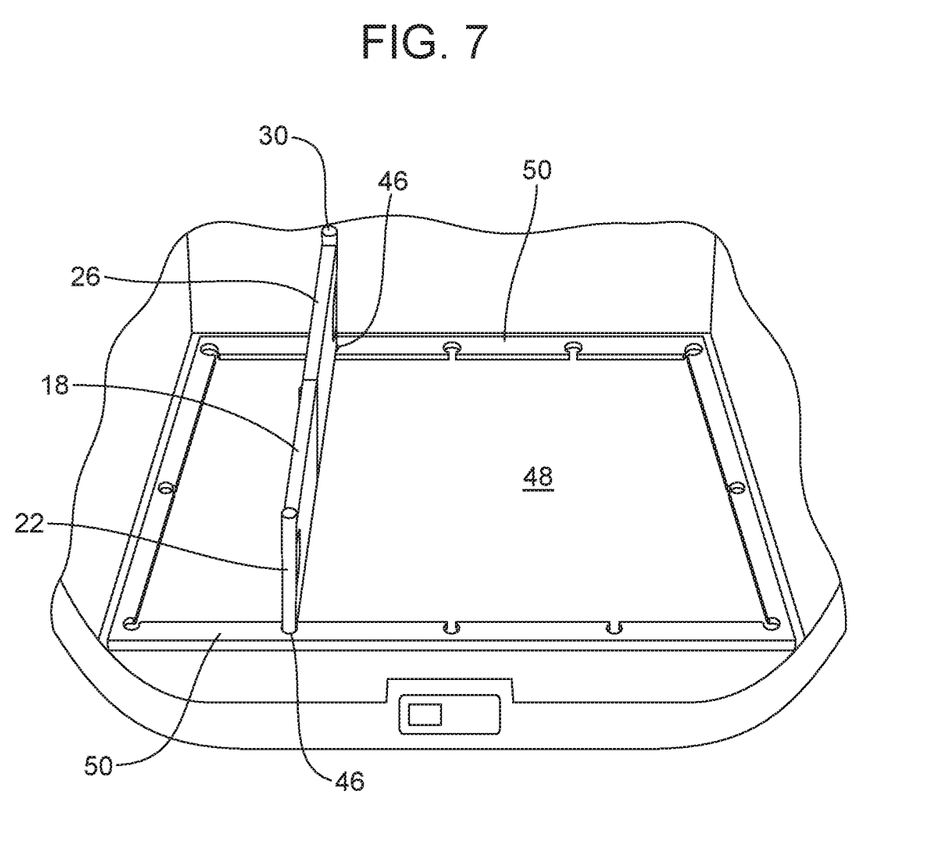

FIGS. 5-7 show three additional, alternative configurations for the partition 12 when held by the base 14. It should be appreciated that these are just four possible configurations and many more are possible by changing the angle between the first divider panel 18 and the second divider panel 26 at the hinge 36 and adjusting the length of the first section 16 and second section 24 of the partition 12 by means of the first telescoping extension panel 20 and second telescoping extension panel 28 in order to align the first peg 22 and second peg 30 with any two sockets 46 in the rail 50 of the base 14 which the user desires to use to support the partition in place.

The foregoing has been presented for purposes of illustration and description. It is not intended to be exhaustive or to limit the embodiments to the precise form disclosed. Obvious modifications and variations are possible in light of the above teachings. For example, the shape of the base 14 and/or the rail 50 may be altered from that illustrated in the drawing figures. More specifically, the shape is not limited to polygons and may in fact include curves or even form a circle. The number of sockets 46 may also be altered from that illustrated. Still further, the partition 12 may include more than the two sections 16, 24 illustrated in this document.

All such modifications and variations are within the scope of the appended claims when interpreted in accordance with the breadth to which they are fairly, legally and equitably entitled.

What is claimed:

1. A storage compartment divider, comprising:
   a partition including (a) a first section with a first peg connected to (b) a second section with a second peg by (c) a hinge; and
   a base including (a) a plurality of sockets receiving said first peg and said second peg and holding said partition in a plurality of positions and (b) a receiver shaped to receive and hold said partition at said hinge when said first section and said second section are folded together about said hinge.

2. The storage compartment divider of claim 1, wherein said first section includes a first divider panel and a first telescoping extension panel.

3. The storage compartment divider of claim 2, wherein said second section includes a second divider panel and a second telescoping extension panel.

4. The storage compartment divider of claim 3, wherein said hinge connects said first divider panel to said second divider panel.

5. The storage compartment divider of claim 4, wherein said first peg is carried on said first telescoping extension panel.

6. The storage compartment divider of claim 5, wherein said second peg is carried on said second telescoping extension panel.

7. The storage compartment divider of claim 6, wherein said first divider panel includes a first pocket and said first telescoping extension panel slides in said first pocket.

8. The storage compartment divider of claim 7, wherein said second divider panel includes a second pocket and said second telescoping extension panel slides in said second pocket.

9. The storage compartment divider of claim 8, wherein said first telescoping extension panel includes a first margin defining a first hand opening adjacent said first peg.

10. The storage compartment divider of claim 9, wherein said second telescoping extension panel includes a second margin defining a second hand opening adjacent said second peg.

11. The storage compartment divider of claim 10, wherein said base comprises a rail secured to a storage compartment floor of a motor vehicle.

12. The storage compartment divider of claim 11, wherein said rail defines a polygonal shape.

13. The storage compartment divider of claim 10, wherein said base comprises a support and a rail secured to said support.

14. The storage compartment divider of claim 13, wherein said rail defines a polygonal shape.

15. The storage compartment divider of claim 14, wherein said support is bordered by said rail.

16. The storage compartment divider of claim 1, wherein said base comprises a rail secured to a storage compartment floor of a motor vehicle.

17. The storage compartment divider of claim 16, wherein said rail defines a polygonal shape.

18. The storage compartment divider of claim 1, wherein said base comprises a support and a rail secured to said support.

\* \* \* \* \*